United States Patent
Basfar et al.

(10) Patent No.: US 9,477,168 B1
(45) Date of Patent: Oct. 25, 2016

(54) POLYMER-ENCAPSULATED CARBON BLACK: PROCESS FOR ITS PREPARATION AND USE THEREOF

(71) Applicant: King Abdulaziz City for Science and Technology, Riyadh (SA)

(72) Inventors: Ahmed Ali Basfar, Riyadh (SA); Jatindranath Maiti, Talda (IN)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 0 days.

(21) Appl. No.: 14/827,261

(22) Filed: Aug. 14, 2015

(51) Int. Cl.
 *C08L 1/00* (2006.01)
 *G03G 9/093* (2006.01)
 *G03G 9/08* (2006.01)

(52) U.S. Cl.
 CPC ........ *G03G 9/09385* (2013.01); *G03G 9/0806* (2013.01)

(58) Field of Classification Search
 CPC .................. G03G 9/09385; G03G 9/0806
 USPC ............................................. 524/35
 See application file for complete search history.

(56) References Cited

U.S. PATENT DOCUMENTS

2003/0215732 A1* 11/2003 Uchida ............... G03G 9/0825
 430/110.3

* cited by examiner

*Primary Examiner* — Hui Chin
(74) *Attorney, Agent, or Firm* — Geeta Kadambi; Riddhi IP LLC

(57) ABSTRACT

A process for preparing a polymer-encapsulated carbon black material is described. The process comprises: (a) preparing a mixture of an ionic monomer, a stabilizer and carbon black in water; (b) adding an initiator; (c) adjusting the temperature to a temperature above room temperature; and (d) adding at least one other monomer and a charge control agent to obtain the material. The process is performed under continuous stirring. The polymer-encapsulated carbon black material is surfactant-free and is used in the production of toners.

19 Claims, 2 Drawing Sheets

POLYMER-ENCAPSULATED CARBON BLACK: PROCESS FOR ITS PREPARATION AND USE THEREOF

FIELD OF TECHNOLOGY

This disclosure relates generally to polymerized toners. More specifically, this disclosure relates to a surfactant-free emulsion polymerization process for preparing a polymer-encapsulated carbon black material. The polymer-encapsulated carbon black material of the disclosure is surfactant-free and is used in the production of toners.

BACKGROUND

At present there are various polymerization processes for preparing toner particles. Such processes have become of great interest in recent years due to the desire to overcome problems associated with toners obtained from pulverized processes. Indeed, the polymerization process allows for a better control of the shape and size distribution of the particles. Polymerization processes are thus known in the art. For example, it is known that toners can be prepared by mini emulsion polymerization/aggregation, by emulsion polymerization/aggregation or by suspension polymerization. These processes do require a surfactant in various degree of amount in order to complete the polymerization successfully.

Indeed, the surfactant plays an important role in polymerization. For example, the surfactant helps in the stabilization of the emulsion/mini emulsion/suspension polymerization compositions. Also, the surfactant helps in the formation of a stable colloidal dispersion and has a strong influence on monomer conversion; viscosity; particle size and their distribution. However, it has been noted that the presence of the surfactant creates problems in the final toner material. For example, surfactant on the toner particles absorbs the moisture contributing to a high relative humidity, which imparts poor adhesion between the toner and the substrate, low tribo charge, dielectric loss, aging and poor toner flow.

In order to circumvent these problems and obtain quality toner particles, basically two options are available. A first option is to remove the surfactant after polymerization and a second option is to avoid the use of any surfactant in the polymerization process. The second option, i.e., surfactant-free polymerization is the preferred option due to the fact that surfactant removal is tedious and resource consuming, which leads to a cost ineffective process.

The emulsion polymerization presents an advantage over mini emulsion polymerization in that it is easily scalable. Indeed, emulsion polymerization does not require any specific homogenization device to generate the emulsion droplets. Moreover, emulsion polymerization differs from suspension polymerization in that it allows for the production of particles with smaller sizes and distribution. Also, emulsion polymerization has an advantage over suspension polymerization in that it allows to simultaneously attain both high molecular weights and high reaction rates. Indeed, soap-free emulsion polymerization offers some advantages over conventional emulsion polymerization such as ease of purification, due to the absence of surfactant. Another advantage of surfactant-free emulsion polymerization lies in benignity of the process and in that it is free from surface active agent.

Jitka Solc (EP0209 879A2) describes a method of producing pigment-containing polymer dispersions by conventional emulsion polymerization. The pigment is encapsulated in styrene and butyl acrylate polymer by emulsion polymerization. The resulting encapsulated particles are employed in toners.

Takahiro Takasaki (U.S. Pat. No. 6,544,706 B1) describes an disclosure related to a production process of polymerized toner of a core-shell structure by suspension polymerization. The combinations of styrene with butyl acrylate (i.e., n-butyl acrylate), and styrene with 2-ethylhexyl acrylate are used as core. Styrene and methyl methacrylate, are used either singly or in combination as shell.

Tiarks et al. (2001) describe the encapsulation of carbon black by a mini emulsion polymerization method. The incorporation of carbon black is achieved by mixing a surfactant stabilized carbon black dispersion and a monomer mini emulsion.

Akasaki et. al., (U.S. Pat. No. 5,219,943) discloses a process for producing monodispersed fine particles of a vinyl polymer, comprising polymerizing monomers containing at least one vinyl monomer, and a methacrylic ester in the presence of a surfactant, a persulfate polymerization initiator, and a divalent metal as an electrolyte. In this process, surfactant is used to stabilize the emulsion during emulsion polymerization.

Nagai et al. (1999) describe the synthesis of carbon black dispersions of high stability, performed by copolymerizing a polymerizable surfactant (1-nonylphenyloxy-2-deca(oxyethylene)-3-alloxypropane ammonium sulfate SE-10N) with acrylonitrile in the presence of carbon black and water. The stability of the dispersion depends mainly on the conversion of the surfmer and the amount of the surfmer adsorbed on carbon black.

Casado et al. (2007) describe polymer encapsulation of water-dispersible, surface-sulfonated carbon black using surfactant-free emulsion polymerization of butyl acrylate, methyl methacrylate and allyl methacrylate. The investigation focuses on the effect of carbon black and the initiator on the conversion of monomer. 40 wt. % of initiator with respect to monomer is employed to get 100% monomer conversion.

Qui et al. (2005) describe a surfactant-free synthesis of styrene and sodium styrene sulfonate (NaSS). The effects of NaSS concentration and the order of addition of the reactants are examined in detail. The results show that the particle size decreases with an increase in the styrene sulfonate concentration. The polydispersity index can be reduced by mixing NaSS with styrene homogeneously before adding the initiator, but this leads to a slightly larger mean particle size.

Adelnia et al. (2014) describe a soap-free emulsion polymerization (SFEP) of methyl methacrylate, butyl acrylate in water/methanol media with sodium salts of four different acidic comonomers, namely, styrene sulfonic acid (NaSS), 2-acrylamide-2-methyl-1-propane sulfonic acid (NaAmps), acrylic acid (NaAA), and itaconic acid (Na$_2$ita). It is found that the introduction of methanol as co-solvent (35 wt %) to the medium greatly decreases the amount of water-soluble polyelectrolyte in the cases NaAA and Na$_2$ita, while it does not make any difference for NaSS and NaAmps. The addition of sulfonic-based co-monomers (NaSS and NaAmps), first decreased particle size and then led to predomination of solution polymerization over surfactant free emulsion polymerization (SFEP). On the contrary, the incorporation of carboxylic-based comonomers (NaAA and Na$_2$ita) led to an increase in particle size.

Brijmohan et al. (2005) describe a sodium styrene sulfonate (NaSS) as an emulsifying co-monomer for surfactant-free emulsion polymerization of styrene and divinyl benzene (DVB). The NaSS oligomers stabilize the polymer particles by forming copolymer with styrene and DVB. The particles are stable in water yielding particle size in the range of 80-90 nm. The particles have broad size distribution which can be attributed to dual nucleation mechanism due to the presence of large amounts of surface active agents. The particle size increases with increasing amounts of DVB in the feed.

Chieh-Min Cheng et. al. (U.S. Pat. No. 6,458,501) depicts an disclosure related to a surfactant-free emulsion polymerization process and to a method for preparing emulsion aggregation toners wherein the latex is formed by surfactant-free emulsion polymerization of styrene/n-butyl acrylate/2-carboxyethyl acrylate (βCEA) copolymer. The preparation of a toner that comprises blending a colorant, preferably a colorant dispersion, more preferably containing a pigment, such as carbon black, phthalocyanine, quinacridone or rhodamine B type, with a latex polymer prepared by surfactant-free polymerization has been illustrated. In this process, surfactant is added to the colorant dispersion. In particular, using the surfactant-free latexes in emulsion aggregation toner generally enables at least 85% surfactant reduction since the bulk of the surfactant in typical toners comes from the latex rather than from the colorant dispersion.

Accordingly, as outlined above, it is known in the art that carbon black encapsulation can be done either by a process involving water dispersible surface modification of carbon black or by using a surfactant in the polymerization process. Also, it is know that the preparation of a polymerized toner can be carried out by suspension/emulsion/mini emulsion polymerization using a surfactant. It is also known that latex can be prepared by a surfactant-free process; however surfactant is added to the colorant dispersion or aggregation composition, the amount of surfactant used at the various stages of the process may be different but their presence is required to facilitate the polymerization for the preparation of the toner.

There is a need for a more cost effective and environmentally friendly process for the preparation of carbon black material.

SUMMARY

A process of preparing a polymer-encapsulated carbon black material is described. There is a need for a process for preparing polymer-encapsulated carbon black material, which does not involve use of a surfactant. This process would eventually provide a shorter procedure to make and use environment friendly materials. The process involves surfactant-free emulsion polymerization. Particles of the polymer-encapsulated carbon black material of the disclosure have a core-shell structure and present a narrow particle species distribution. An advantage of the core-shell structure is that some properties of the material stem from the core structure and other properties stem from the shell structure.

The said process allows for the incorporation of a charge control agent during polymerization, which leads to a homogeneous charge distribution on the particle surface. The said process also allows for the production of colored polymer particles. Such particles may comprise a carbon black colorant, a polymer layer and a charge control agent which attaches to the colored polymer particles. Several embodiments for the process and material are outline below.

The disclosure provides for a process for preparing a polymer-encapsulated carbon black material, comprising: (a) preparing a mixture of an ionic monomer, a stabilizer and carbon black in water; (b) adding an initiator; (c) adjusting the temperature to a temperature above room temperature; and (d) adding at least one other monomer and a charge control agent to obtain the material. The process is performed under continuous stirring. The disclosure also provides for the polymer-encapsulated carbon black material prepared by the process of the disclosure. Moreover, the disclosure provides for toners produced using the polymer-encapsulated carbon black material.

In one embodiment, the process for preparing a polymer-encapsulated carbon black material, comprises the following steps: (a) preparing a mixture of an ionic monomer, a stabilizer and carbon black in water; (a1) adjusting the pH to about 4 to 10, preferably 4, 8 or 10; (b) adding an initiator; (c) adjusting the temperature to about 60 to 80° C., preferably about 73° C.; (d) adding at least one other monomer and a charge control agent to obtain the polymer-encapsulated carbon black material, wherein the addition is performed over a period of time of about 20 to 40 minutes, preferably about 30 minutes; (e) cooling to room temperature; and (f) adding an inhibitor. Also in this embodiment, the process is performed under continuous stirring.

In one embodiment, between steps (b) and (d) as described above, there a period of time of up to 30 minutes, preferably about 30 minutes. In one embodiment, between steps (d) and (e) as described above, there is a period of time of about 3 to 6 hours, preferably about 4 hours.

In one embodiment, a weight amount ratio of the at least one other monomer to the ionic monomer is between 99/1 to 0/100, preferably 99/1, 95/5, 89/11, 75/25, 34/66, 20/80 or 0/100. In one embodiment, an amount of carbon black is up to about 10 wt % of a total amount of the ionic monomer and the at least one other monomer, preferably the amount is about 10 wt %.

In one embodiment, an amount of stabilizer is up to about 20 wt % of a total amount of the ionic monomer and the at least one other monomer, preferably the amount is about 20 wt %. In one embodiment, an amount of charge control additive is up to about 5 wt % of a total amount of the ionic monomer and the at least one other monomer, preferably the amount is about 5 wt %.

In one embodiment, the ionic polymer is selected from the group consisting of sodium styrene sulfonate (NaSS), styrene (St), and n-butyl acrylate (BA). In one embodiment, the stabilizer is selected from the group consisting of poly ethylene glycol (PEG), polyvinyl alcohol (PVA), polyvinyl pyrrolidone (PVP), and carboxy methyl cellulose (CMC). In one embodiment, the carbon black is selected from the group consisting of Regal R99 from Cabot, USA; furnace blacks Nipex®35; Nipex®90; and the oxidized gas black Nipex®150 from Evonik company.

In one embodiment, the initiator is selected from the group consisting of potassium peroxidisulfate (KPS), ammonium persulfate, potassium persulfate, sodium persulfate, ammonium bisulfate, sodium bisulfate, 1,1'-azobis(1-methylbutyronitrile-3-sodium sulfonate), and 4,4'-azobis(4-cyanovaleric acid). In one embodiment, the at least one other monomer is selected from the group consisting of acrylate, acrylic and methacrylic esters, vinyl esters of aliphatic acids, and monomers containing sulfonate groups.

In one embodiment, the charge control agent is selected from the group consisting of benztltributylammonium-4-hydroxyl-napthalene-1-sulfonate (MEP-51), 3,5-di-t-butyl salicyclic acid salt (MEC-84, MEC-84S, MEC-84E), aluminum salicylate (MEC-88), 3,5-bis(1,1-dimethylethyl)-2-hydroxybenzoic acid, aluminum complex (MEC-91), and zirconium salicylates (MEC-105, MEC-105/S) from KMT. In one embodiment, the inhibitor is selected from the group consisting of quinones and the like; preferably hydroquinone, 4-tert-butylcatechol and p-benzoquinone; more preferably hydroquinone.

In one embodiment, the ionic monomer is sodium styrene sulfonate (NaSS), the stabilizer is poly ethylene glycol (PEG), the initiator is potassium peroxidisulfate (KPS), and the other monomers are styrene and butyl acrylate. Other features will be apparent from the accompanying drawings and from the detailed description that follows.

BRIEF DESCRIPTION OF DRAWINGS

Example embodiments are illustrated by way of example and not limitation in the figures of the accompanying drawings, in which.

Figure 1:
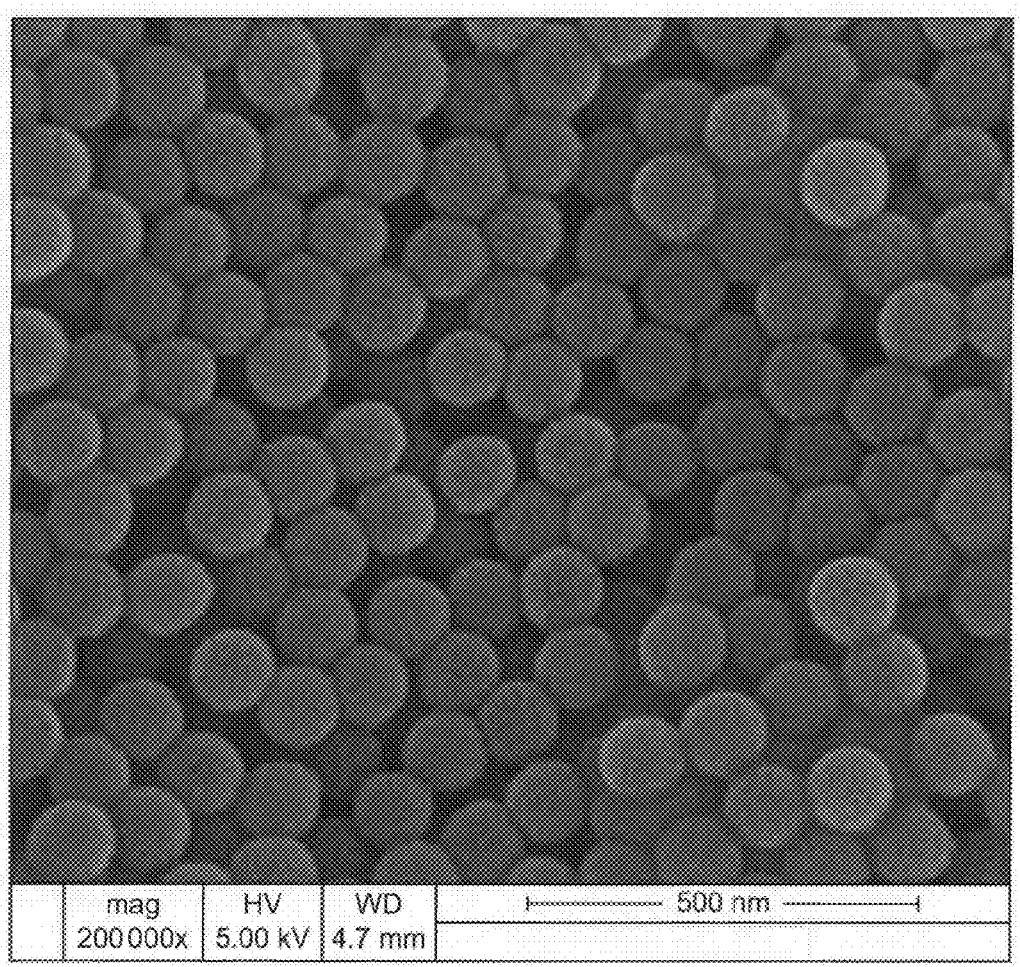
FIG. 1 is an image of a scanning electron microscope (SEM) of carbon black encapsulated polymer particles with charge control agent (composition: St+BA+NaSS: 15 g, PEG: 0.75 g, KPS: 0.375 g, CB: 0.75 g, Aluminium Salicylate (MEC-88): 0.75 g, Water: 75 g, pH: 8).

Other features of the present embodiments will be apparent from the accompanying detailed description that follows.

DETAILED DESCRIPTION

The present disclosure is drawn to the encapsulation of carbon black into the polymer matrix without using a surfactant. The drive to remove emulsion polymerization's dependence on surfactant, while obtaining stable and homogeneous latex after polymerization is more and more important due to the disadvantages associated with contamination of the final product by the surfactant for toner application. The present disclosure is directed to a process of preparing environmentally friendly latex particles that are suitable for toner application.

In the present disclosure, more than one monomer can be used to encapsulate carbon black for preparing a latex polymer of the disclosure. As will be understood by a skilled person any monomer capable of forming a copolymer with styrene may be used as co-monomer. Co-monomers useful in the surfactant-free process of the disclosure include, but are not limited to, acrylate, acrylic and methacrylic esters, vinyl esters of aliphatic acids, monomers containing sulfonate groups, etc. Preferably, the monomers include styrene (St), n-butyl acrylate (BA) and sodium styrene sulfonate (NaSS).

The initiator added to the mixture to form the polymer can be a free radical initiator that attaches to the polymer forming ionic, hydrophilic end groups on the polymer. Stabilization in emulsifier- or surfactant-free techniques is due to chemically bound surface groups such as for example sulfate (from persulfate). However, these groups provide sufficiently high surface-charge densities to stabilize against coagulation. The presence of these ionic, hydrophilic end groups on the polymer stabilizes the latex. The stability results from the electrostatic repulsion of the charged groups on a given latex particle with respect to those on the other particles. As will be understood by a skilled person, suitable initiators include, but are not limited to, ammonium persulfate, potassium persulfate, sodium persulfate, ammonium bisulfate, sodium bisulfate, 1,1'-azobis(1-methylbutyronitrile-3-sodium sulfonate), and 4,4'-azobis(4-cyanovaleric acid). Preferably, the initiator is a persulfate initiator such as ammonium persulfate, potassium persulfate, sodium persulfate and the like. The initiator is added as part of an initiator solution in water.

In order to maintain the stability of the emulsion and latex particles formed, the concentration of the initiator is an important factor. The amount of initiator used to form the latex polymer is generally from about 0.1 to about 10 percent by weight of the monomer to be polymerized.

The decomposition of potassium persulfate is self-accelerating at low pH under acidic conditions. Also polymerization of styrene is experienced best in weakly alkaline medium. That is the reason for changing the different pH conditions in the standard recipes.

During the synthesis of polymer colloids, various stabilizing agents are used in various heterogeneous polymerizations for stabilization of emulsions against flocculation, coalescence and Ostwald ripening. As will be understood by a skilled person when a stabilizer is used, its amount is an important factor in determining whether the system can be homogeneous and stable. Suitable stabilizers include but are not limited to poly ethylene glycol (PEG), polyvinyl alcohol (PVA), polyvinyl pyrrolidone (PVP), carboxy methyl cellulose (CMC) stabilizers. A stabilizer is typically used in the polymerization process in an amount of, for example, from about 0.1 to about 50 percent by weight of monomer, and preferably in an amount from about 1 to about 30 percent by weight of the monomer.

Polymerization performed in the presence of low molar mass PEG forms a certain amount of coagulum suggesting that a minimum molar mass is necessary to stabilize the formed objects. The use of PEG with a molar mass of 1500 & 2000 g/mol gives stable latexes. However, the formed particles are slightly bigger than those synthesized in the presence of PEG of lower molar mass, likely because high molar mass macro monomers are capable of bridging neighboring latex particles and promote aggregation.

Carbon black (CB) is an important pigment containing 90 to 99% of elemental carbon in which the smallest dispersible units are irregularly shaped aggregates that range from 50 to 500 nm in size. Because of its good properties such as low cost, chemical, and heat resistance; carbon black pigment has been used as toners in copier and laser printers. It is generally present in the toner in an effective amount of, for example, from about 1 to about 15 percent by weight of toner, and preferably in an amount of from about 3 to about 10 percent by weight of the toner. Illustrative examples of carbon black, that may be used in the processes of the present disclosure include, but are not limited to, carbon black (Regal R99, Cabot, USA); furnace blacks Nipex®35, Nipex®90, and the oxidized gas black Nipex®150 from Evonik company; and the like.

A charge control agent (CCA) is an important component of a toner material. There are two types of CCA, a CCA of positive charge and a CCA of negative charge. Selection of a suitable CCA for the particular system depends on many factors. However, good dispersion of the CCA should be the bench mark for considering the particular CCA to be used in the polymerization system.

Charge control agents may be used, in suitable effective amounts of, for example, from 0.1 to 5 weight percent by weight of the toner. Suitable charge agents include, but are not limited to, benztltributylammonium4-hydroxyl-napthalene-1-sulfonate (MEP-51), 3,5-di-t-butyl salicyclic acid salt (MEC-84, MEC-84S, MEC-84E), aluminum salicylate (MEC-88), 3,5-bis(1,1-dimethylethyl)-2-hydroxybenzoic acid, aluminum complex (MEC-91), zirconium salicylates (MEC-105, MEC-105/S) from KMT company and like.

In the present disclosure, we allow NaSS to be polymerized first and form an ionic interaction with CB. Then after a period of time of zero to about 30 minutes after initiator injection, St and BA are added to the system. On the basis of the above experimental, the primary particle is initially built up from soluble NaSS oligomers. The radical oligomers subsequently grow by polymerization involving chain growth of the oligomers inside the particle using the available monomers in the solution and by adsorption of still water-soluble oligomers and development of ionic interaction with CB. Then St and BA start to grow as a secondary particle forming core-shell particles which have poly NaSS with carbon black in core and St and BA polymer in outer shell.

The mixture of St and BA monomers is generally fed to the composition during a time period of, for example, about 0.1 to 10 hours, preferably about 0.5 hours. The emulsion polymerization is generally conducted at a temperature of from about 35° C. to about 125° C., preferably at about 70-80° C.

Uniform speed stirring is preferably maintained throughout the addition of the monomer composition to the reaction vessel, and the temperature of the materials within the reaction vessel is also preferably kept substantially constant.

The following example illustrates specific embodiments of the present disclosure. All parts and percentages are by weight, unless otherwise indicated.

TABLE 1

All materials used for the examples are summarized in the following:
Material list

| Material | Chemical name | Producer | Characteristic |
|---|---|---|---|
| Styrene | styrene | Duksan Pure Chemical, Korea | |
| Butyl acrylate | Butyl acrylate | Aldrich, Germany | |
| Sodium styrene sulfonate (NASS) | Sodium styrene sulfonate | Aldrich, Germany | |
| Polyethylene glycol 400 (PEG) | Polyethylene glycol | Aldrich, Germany | Average molecular weight: 400 g/mol |
| Polyethylene glycol 950-1050 (PEG) | Polyethylene glycol | Aldrich, Germany | Average molecular weight: 950-1050 g/mol |
| Polyethylene glycol 1500 (PEG) | Polyethylene glycol | Aldrich, Germany | Average molecular weight: 1,500 g/mol |
| Polyethylene glycol 2000 (PEG) | Polyethylene glycol | Aldrich, Germany | Average molecular weight: 2,000 g/mol |
| Polyvinyl alcohol (PVA) | Polyvinyl alcohol | Aldrich, Germany | Average molecular weight: 31,000 g/mol |
| Carboxymethyl cellulose sodium salt low viscosity (CMC) | Carboxymethyl cellulose sodium salt | Aldrich, Germany | Molecular weight: 90 kDa Degree of polymerization: 400 Degree of substitution: 0.65-0.90 (6.5-9.0 carboxymethyl groups per 10 anhydroglucose units). Sodium content: Approximately 8% by weight. |
| Polyvinylpyrolidone (PVP) | Polyvinylpyrolidone | International Laboratory, CANADA | Average molecular weight: 10,000 g/mol |
| Potassium peroxydisulfate (KPS) | Potassium peroxydisulfate | International Laboratory, CANADA | Initiator |
| Carbon black (Regal 99R) | Carbon black | Cabot corporation, USA | |
| Sodium bicarbonate | Sodium bicarbonate | BDH Chemical, USA | |
| Hydroquinone (HQ) | Hydroquinone | Sigma Aldrich, Germany | Inhibitor |
| Sodium hydroxide (NaOH) | Sodium hydroxide | Sigma Aldrich, Germany | |
| Sodium sulphate anhydrous | Sodium sulphate anhydrous | Panreac chemical company, Spain | |
| Sodium Chloride (NaCl) | Sodium Chloride | Sigma Aldrich, Germany | |
| Molecular sieve | Molecular sieve | Winlab Laboratory Chemicals, USA | Molecular Sieve 4A, 1-2 mm, 8-12 mesh, 1/16 |
| MEC-88 | Aluminium Salicylate | KMT Co. Ltd. South Korea. | Charge control agent (negative) |

EXAMPLES

Styrene is extracted three times with a 0.1 N NaOH solution, followed by washing with brine and water. Then anhydrous sodium sulfate is used to absorb the water from styrene solution. Subsequently, styrene is filtered and stored with molecular sieve in a refrigerator not longer than 15 days. For the purification of butyl acrylate, a procedure similar to the one for styrene is followed.

NaSS, PEG and CB in 65 gram of water are added to a three neck round bottom flask connected with mechanical stirrer. The water can be deionized water. The pH of the mixture is adjusted. The pH can be between about 4 to 10, preferably 4, 8 or 10. The mixture is degassed with 3 times vacuum (at 70 mbar) and $N_2$ purging. The reaction is carried out at 500 rpm under $N_2$ atmosphere. The temperature is raised to 73° C. After reaching 73° C., KPS in 10 ml water is added to the flask by syringe. Subsequently styrene and butyl acrylate monomer and charge control agent are added to the flask drop by drop by syringe over a period of 30 min. It is then allowed to polymerize for further 4 h. After 4 h, the reaction mixture is cooled down to room temperature using ice water. Hydroquinone (HQ) dissolved in water is added to reaction mixture with slow stirring for 10 min. Various compositions were prepared following this procedure. The compositions prepared are summarized in Table 2 below.

The latex collected containing 14-18 percent solids with an average particle size in the range of 100-400 nm with low PDI is generally obtained. The latex possesses a glass transition temperature ($T_g$) in the range of 60-70° C. The number average molecular weight ($M_n$) is in the range of 50000-100000 g/mol. The properties of the compositions prepared following the outline above are presented in Table 2.

A scanning electron microscope (SEM NNL 200, FEI Company, Netherlands) is used to evaluate the latex microstructure. Samples are prepared on C-tape. A small drop of latex is placed on flat surface of C-tape. Samples are dried in air and coated with 3 nm Pt. Spherical shape of CB encapsulated polymer particle with homogeneous distribution is observed in SEM micrographs presented for example in FIG. 1. A composition is as follows: St+BA+NaSS: 15 g, PEG: 0.75 g, KPS: 0.375 g, CB: 0.75 g, Aluminium Salicylate (MEC-88): 0.75 g, Water: 75 g, pH: 8.

Figure 2:
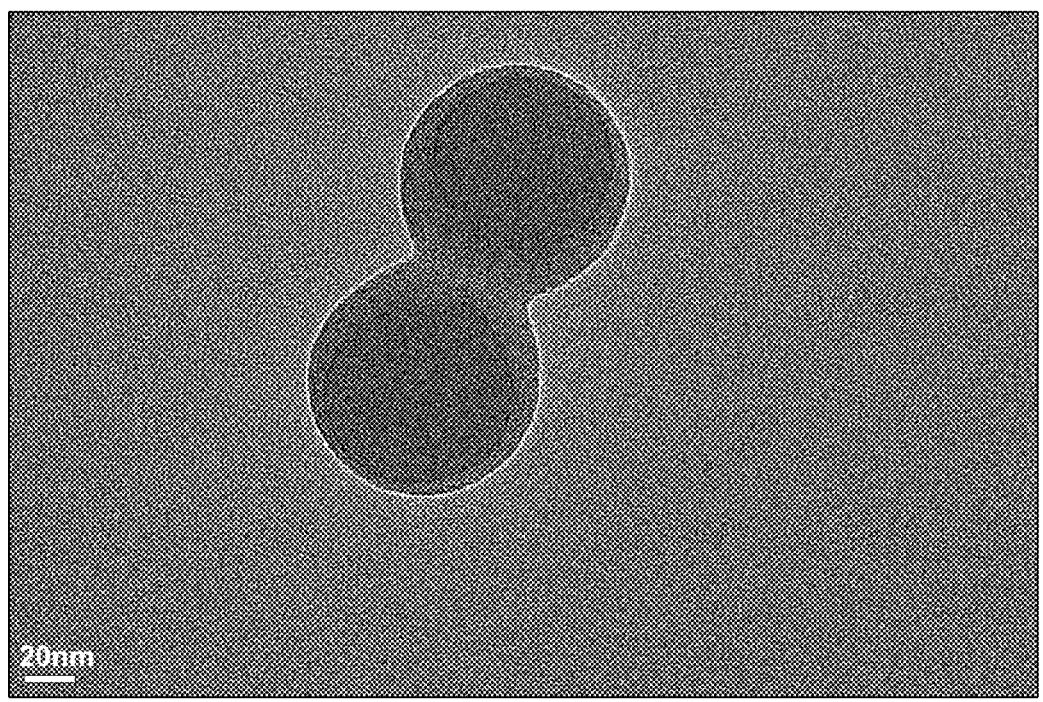
FIG. 2 is a transmission electron microscopy (TEM) of carbon black encapsulated polymer with charge control agent (composition: St+BA+NaSS: 15 g, PEG: 0.75 g, KPS: 0.375 g, CB: 0.75 g, Aluminium Salicylate (MEC-88): 0.75 g, Water: 75 g, pH: 8).

Transmission electron microscopy (TEM) is performed with a Jeol 2100F, Japan. A small drop of latex is placed on carbon grid and dried in air. TEM images show that the core shell latex particle is observed; see FIG. 2 (a composition is as outlined above for FIG. 1). The shape of the particles is almost perfectly spherical with smooth interfaces.

Table 2 below outlines the compositions prepared and the properties of the polymer latex.

| Code | St (g) | BA (g) | NaSS (g) | Stabilizer Type | Stabilizer (g) | KPS (g) | pH | $H_2O$ (g) | CB Regal 99R (g) | CCA MEC-88 (g) | Z average (nm) | PDI | $T_{g_r}$ (Temp) | $M_n$ (g/mol) |
|---|---|---|---|---|---|---|---|---|---|---|---|---|---|---|
| Variation of copolymerization composition ||||||||||||||||
| EM-1 | 14.25 | 0 | 0.75 | 0 | 0 | 0.375 | 8 | 75 | 0 | | 73 | 0.03 | 105 | 73000 |
| EM-2 | 13.5 | 0.75 | 0.75 | 0 | 0 | 0.375 | 8 | 75 | 0 | | 77 | 0.1 | 75 | 111000 |
| EM-3 | 11.25 | 3 | 0.75 | 0 | 0 | 0.375 | 8 | 75 | 0 | | 91 | 0.1 | 69 | 75000 |
| Variation of Different molecular weight of PEG ||||||||||||||||
| EM-4 | 11.25 | 3 | 0.75 | PEG 2000 | 0.75 | 0.375 | 8 | 75 | 0 | | 108 | 0.05 | 65 | 61000 |
| EM-5 | 11.25 | 3 | 0.75 | PEG 1500 | 0.75 | 0.375 | 8 | 75 | 0 | | 105 | 0.02 | 70 | 155000 |
| EM-6 | 11.25 | 3 | 0.75 | PEG 1000 | 0.75 | 0.375 | 8 | 75 | 0 | | 122 | 0.01 | 70 | 52000 |
| EM-7 | 11.25 | 3 | 0.75 | PEG 400 | 0.75 | 0.375 | 8 | 75 | 0 | | 117 | 0.01 | 74 | 78000 |
| Variation of PEG content ||||||||||||||||
| EM-8 | 11.25 | 3 | 0.75 | PEG 1500 | 0.15 | 0.375 | 8 | 75 | 0.75 | | 139 | 0.1 | 70 | 94000 |
| EM-9 | 11.25 | 3 | 0.75 | PEG 1500 | 0.75 | 0.375 | 8 | 75 | 0.75 | | 113 | 0.03 | 70 | 134000 |
| EM-10 | 11.25 | 3 | 0.75 | PEG 1500 | 0.9 | 0.375 | 8 | 75 | 0.75 | | 159 | 0.03 | 70 | 70000 |
| EM-11 | 11.25 | 3 | 0.75 | PEG 1500 | 1.5 | 0.375 | 8 | 75 | 0.75 | | 148 | 0.05 | 66 | 80000 |
| EM-12 | 11.25 | 3 | 0.75 | PEG 1500 | 3.0 | 0.375 | 8 | 75 | 0.75 | | 162 | 0.09 | — | 54000 |
| Variation of reaction pH condition ||||||||||||||||
| EM-13 | 11.25 | 3 | 0.75 | PEG 1500 | 0.75 | 0.375 | 4 | 75 | 0.75 | | 155 | 0.08 | 65 | 42000 |
| EM-14 | 11.25 | 3 | 0.75 | PEG 1500 | 0.75 | 0.375 | 8 | 75 | 0.75 | | 155 | 0.04 | 63 | 54000 |
| EM-15 | 11.25 | 3 | 0.75 | PEG 1500 | 0.75 | 0.375 | 10 | 75 | 0.75 | | 155 | 0.01 | 75 | 68000 |
| Variation of NaSS content ||||||||||||||||
| EM-16 | 11.85 | 3 | 0.15 | PEG 1500 | 0.75 | 0.375 | 8 | 75 | 0.75 | | 374 | 0.09 | 62 | 40000 |
| EM-17 | 11.25 | 3 | 0.75 | PEG 1500 | 0.75 | 0.375 | 8 | 75 | 0.75 | | 113 | 0.03 | 70 | 134000 |
| EM-18 | 10.5 | 3 | 1.5 | PEG 1500 | 0.75 | 0.375 | 8 | 75 | 0.75 | | 222 | 0.1 | 65 | 97000 |
| EM-19 | 9 | 3 | 3 | PEG 1500 | 0.75 | 0.375 | 8 | 75 | 0.75 | | 217 | 0.1 | 62 | 81000 |
| EM-20 | 6 | 3 | 6 | PEG 1500 | 0.75 | 0.375 | 8 | 75 | 0.75 | | 208 | 0.1 | — | 75000 |
| EM-21 | 0 | 3 | 12 | PEG 1500 | 0.75 | 0.375 | 8 | 75 | 0.75 | | 229 | 0.1 | — | — |
| EM-22 | 0 | 0 | 15 | PEG 1500 | 0.75 | 0.375 | 8 | 75 | 0.75 | | 911 | 0.4 | — | — |

-continued

| Code | St (g) | BA (g) | NaSS (g) | Stabilizer Type | KPS (g) | H$_2$O (g) | pH | CB Regal 99R (g) | CCA MEC-88 (g) | Z average (nm) | PDI | T$_g$, (Temp) | M$_n$ (g/mol) |
|---|---|---|---|---|---|---|---|---|---|---|---|---|---|
| Variation of carbon black amount | | | | | | | | | | | | | |
| EM-23 | 11.25 | 3 | 0.75 | PEG 1500 | 0.75 | 0.375 | 8 | 75 | 0.15 | | 122 | 0.01 | 70 | 52000 |
| EM-24 | 11.25 | 3 | 0.75 | PEG 1500 | 0.75 | 0.375 | 8 | 75 | 0.375 | | 117 | 0.2 | 67 | 91000 |
| EM-25 | 11.25 | 3 | 0.75 | PEG 1500 | 0.75 | 0.375 | 8 | 75 | 0.75 | | 122 | 0.2 | 67 | 66000 |
| EM-26 | 11.25 | 3 | 0.75 | PEG 1500 | 0.75 | 0.375 | 8 | 75 | 1.125 | | 150 | 0.07 | 71 | 49000 |
| EM-27 | 11.25 | 3 | 0.75 | PEG 1500 | 0.75 | 0.375 | 8 | 75 | 1.5 | | 258 | 0.2 | 70 | 70000 |
| Variation of stabilizer | | | | | | | | | | | | | |
| EM-28 | 11.25 | 3 | 0.75 | PVA | 0.75 | 0.375 | 8 | 75 | 0.75 | | 459 | 0.5 | — | — |
| EM-29 | 11.25 | 3 | 0.75 | PVP | 0.75 | 0.375 | 8 | 75 | 0.75 | | 612 | 0.9 | — | — |
| EM-30 | 11.25 | 3 | 0.75 | CMC | 0.75 | 0.375 | 8 | 75 | 0.75 | | 936 | 1.0 | — | — |
| EM-31 | 11.25 | 3 | 0.75 | PEG 1500 | 0.75 | 0.375 | 8 | 75 | 0.75 | | 150 | 0.07 | — | — |
| Effect of CCA | | | | | | | | | | | | | |
| EM-32 | 11.25 | 3 | 0.75 | PEG 1500 | 0.75 | 0.375 | 8 | 75 | 0.75 | 0.15 | 145 | 0.007 | 68 | 77000 |
| EM-33 | 11.25 | 3 | 0.75 | PEG 1500 | 0.75 | 0.375 | 8 | 75 | 0.75 | 0.375 | 130 | 0.03 | 68 | 74000 |
| EM-34 | 11.25 | 3 | 0.75 | PEG 1500 | 0.75 | 0.375 | 8 | 75 | 0.75 | 0.75 | 122 | 0.05 | 67 | 86000 |

Although the present embodiments have been described with reference to specific example embodiments, it will be evident that various modifications and changes may be made to these embodiments without departing from the broader spirit and scope of the various embodiments. The present disclosure refers to a number of documents, the content of which is herein incorporated by reference in their entirety.

INDUSTRIAL APPLICABILITY

The polymer-encapsulated carbon back material of the disclosure is obtained from a process wherein no surfactant is used. Thus the material is surfactant-free. Such surfactant-free polymer-encapsulated carbon black has application in toners. The production process of such toners is environmentally friendly and cost efficient. It will be appreciated that the polymer encapsulated carbon material, toners comprising such material, use of the material and the toners, and processes for preparing the material and the toners disclosed herein may be embodied in various combinations to produce environmentally friendly and cost efficient toners. Accordingly, the specification and drawings are to be regarded in an illustrative rather than a restrictive sense.

What is claimed is:

1. A process for preparing a polymer-encapsulated carbon black material, comprising:
   (a) preparing a mixture of an ionic monomer, a stabilizer and carbon black pigment in water;
   (a1) adjusting the pH to about 4 to 10;
   (b) adding an initiator;
   (c) adjusting the temperature to a temperature above room temperature; and
   (d) adding at least one other monomer and a charge control agent to obtain the polymer-encapsulated carbon black material, wherein the process is performed under continuous stirring.

2. The process according to claim 1, wherein step (d) is performed over a period of time of about 20 to 40 minutes.

3. The process according to claim 1, wherein between steps (b) and (d), there is a period of time of up to about 30 minutes.

4. The process according to claim 1, wherein the temperature at step (c) is about 60 to 80° C.

5. The process according to claim 1, further comprising: after step (d), a step of cooling to room temperature (e) and a step of adding an inhibitor (f).

6. The process according to claim 1, wherein a weight amount ratio of the at least one other monomer to the ionic monomer is from 99/1 to 20/80.

7. The process according to claim 1, wherein an amount of carbon black pigment is up to about 10 wt % of a total amount of the ionic monomer and the at least one other monomer.

8. The process according to claim 1, wherein an amount of stabilizer is up to about 20 wt % of a total amount of the ionic monomer and the at least one other monomer.

9. The process according to claim 1, wherein an amount of charge control agent is up to about 5 wt % of a total amount of the ionic monomer and the at least one other monomer.

10. The process according to claim 1, wherein the ionic monomer is selected from the group consisting of sodium styrene sulfonate (NaSS), and n-butyl acrylate (BA).

11. The process according to claim 1, wherein the stabilizer is selected from the group consisting of polyethylene glycol (PEG), polyvinyl alcohol (PVA), polyvinyl pyrrolidone (PVP), and carboxy methyl cellulose (CMC).

12. The process according to claim 1, wherein the carbon black pigment is selected from the group consisting of carbon black; furnace blacks; and the oxidized gas black.

13. The process according to claim 1, wherein the initiator is selected from the group consisting of potassium peroxidisulfate (KPS), ammonium persulfate, potassium persulfate, sodium persulfate, ammonium bisulfate, sodium bisulfate, 1,1'-azobis(1-methylbutyronitrile-3-sodium sulfonate), and 4,4'-azobis(4-cyanovaleric acid).

14. The process according to claim 1, wherein the at least one other monomer is selected from the group consisting of acrylate, acrylic and methacrylic esters, vinyl esters of aliphatic acids, monomers containing sulfonate groups, styrene (St), n-butyl acrylate (BA) and sodium styrene sulfonate (NaSS).

15. The process according to claim 1, wherein the charge control agent is selected from the group consisting of benzyltributylammonium-4-hydroxyl-naphthalene-1-sulfonate, 3,5-di-t-butyl salicyclic acid salt, aluminium salicylate, 3,5-bis(1,1-dimethylethyl)-2-hydroxybenzoic acid, aluminum complex, and zirconium salicylates.

16. A process according to claim 1, wherein the ionic monomer is sodium styrene sulfonate (NaSS), the stabilizer is polyethylene glycol (PEG), the initiator is potassium peroxidisulfate (KPS), and the other monomers are styrene and butyl acrylate.

17. A process for preparing a polymer-encapsulated carbon black material, comprising:
(a) preparing a mixture of an ionic monomer, a stabilizer and carbon black pigment in water;
(a1) adjusting the pH to about 4 to 10;
(b) adding an initiator;
(c) adjusting the temperature to about 60 to 80° C.;
(d) adding at least one other monomer and a charge control agent to obtain the polymer encapsulated carbon black material, wherein the addition is performed over a period of time of about 20 to 40 minutes;
(e) cooling to room temperature; and
(f) adding an inhibitor, wherein the process is performed under continuous stirring.

18. The process according to claim 17, wherein between steps (d) and (e) there is a period of time of about 3 to 6 hours.

19. The process according to claim 17, wherein the inhibitor is selected from the group consisting of hydroquinone, 4-tert-butylcatechol and p-benzoquinone.

* * * * *